J. M. HEARD.

Moth-Trap.

No. 27,048.

Patented Feb. 7. 1860.

Witnesses:
Oscar Pollard
J. R. Saunders

Inventor,
Joseph M. Heard

UNITED STATES PATENT OFFICE.

JOS. M. HEARD, OF ABERDEEN, MISSISSIPPI.

MOTH-TRAP.

Specification of Letters Patent No. 27,048, dated February 7, 1860.

*To all whom it may concern:*

Be it known that I, J. M. HEARD, of Aberdeen, in the county of Monroe and State of Mississippi, have invented a new and Improved Moth-Trap; and I do hereby declare that the following is a full, clear, and exact description of the same, reference being had to the annexed drawings, making a part of this specification, in which—

Figure 1:
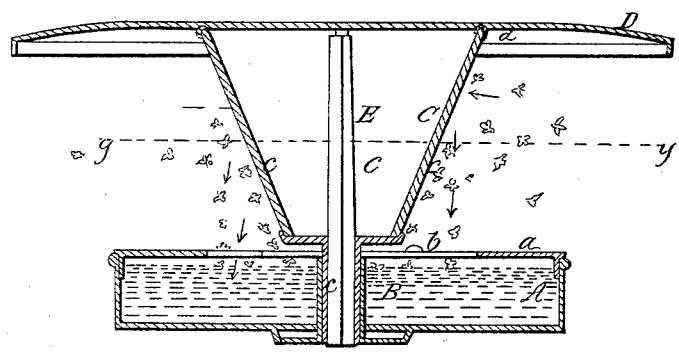
Figure 2:
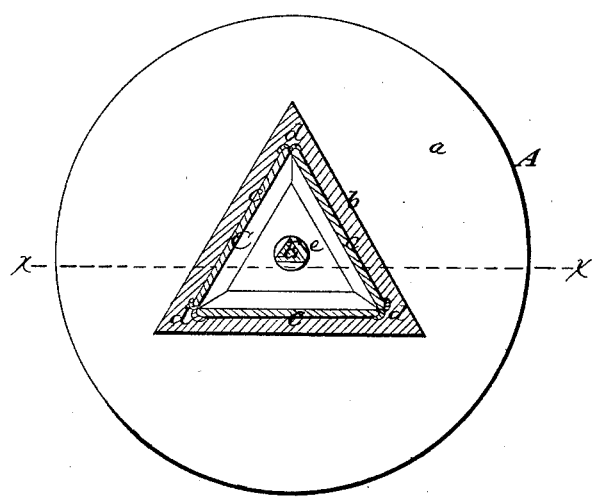

Figure 1, is a vertical section of my invention taken in the line $x$, $x$, Fig. 2. Fig. 2, is a horizontal section of same, taken in the line $y$, $y$, Fig. 1.

Similar letters of reference indicate corresponding parts in the two figures.

This invention consists in the employment or use of a lamp provided with a peculiar light, bait reservoir and cover, arranged substantially as hereinafter fully shown and described, whereby moth, or rather the winged insects that produce them, are decoyed and effectually destroyed.

The invention is chiefly designed for the use of agriculturalists to destroy the insects that commit great ravages on growing crops and various kinds of fruit and other trees.

To enable those skilled in the art to fully understand and construct my invention I will proceed to describe it.

A, represents a circular basin which may be constructed of sheet metal with a vertical tube or socket B, at its center, said tube or socket extending through the bottom of the basin and open at both its upper and lower ends. The basin A, is provided with a cover $a$, which is perforated at its center with a triangular opening $b$, the form being shown clearly in Fig. 2.

C, is a lamp which is of taper tri-lateral form, the smaller end being at the bottom, as shown clearly in Fig. 1. This lamp is formed of three glass plates $c$, fitted in a suitable frame $d$, which may be of sheet metal, the lower plate or bottom of the frame having a tube $e$, attached which tube is fitted within the socket B, of the basin and secures the lamp thereto. The tube $e$, like the socket B, is open at both ends and the lamp has a top or cover D, which projects beyond the basin A, as shown clearly in Fig. 1. The dimensions of the opening $b$, correspond with those of the upper end of the lamp C.

The operation is as follows:—The basin A, is supplied with a requisite quantity of molasses or other suitable substance to serve as a bait, and the inner sides of the glass plates $c$, of the lamp C, are covered with a mixture of phosphorus and oil or phosphorus combined with any suitable substance to form a cement, or a stick E, may be coated with the cement, said stick being passed through the tube $e$, into the lamp, as shown plainly in Fig. 1. The insects decoyed by the light and attracted by the bait, strike against the inclined glass plates $c$, and fall into the basin A. By having the plates $c$, inclined the insects are made to fall through the opening $b$, into the basin and said opening is permitted to be comparatively small and the cover $a$, of the basin in connection with the cover D, of lamp protect perfectly the bait from sun and rain, thereby protecting an unnecessary waste of the same. During the day the phosphorus of course is not needed unless it be cloudy, but the device is chiefly efficacious at night as the visits of the insects are mostly nocturnal.

I am aware that moth traps have been previously used, but so far as I am aware an ordinary oil lamp or candle has been employed for a light. This illuminating material is attended with considerable expense and also with considerable trouble as the trap requires frequent cleaning. The traps also that I have seen do not fully protect the bait and it is spoiled by the rain and the action of the sun. In my invention the trap does not require frequent cleaning as the material employed for a light does not soil the device, and as the bait in the basin is fully protected from the weather it does not require to be often renewed.

I do not claim any part or feature of the device patented by S. C. Wilts, Oct. 7, 1846.

I do not claim broadly the employment or use of a lamp in connection with a bait reservoir for decoying and entrapping moth or the winged insects which produce them, for such devices have been previously used; but I do claim as new and desire to secure by Letters Patent, The arrangement of the circular projecting top D, lamp C formed of the triangular plates $c$, phosphoric illuminator E and reservoir or basin A, as and for the purposes herein shown and described, the whole being constructed as set forth.

JOSEPH M. HEARD.

Witnesses:
I. R. SANDERS,
OSCAR POLLERD.